*J. Harpster,*
*Gate.*
No. 96,002. Patented Oct. 19, 1869.
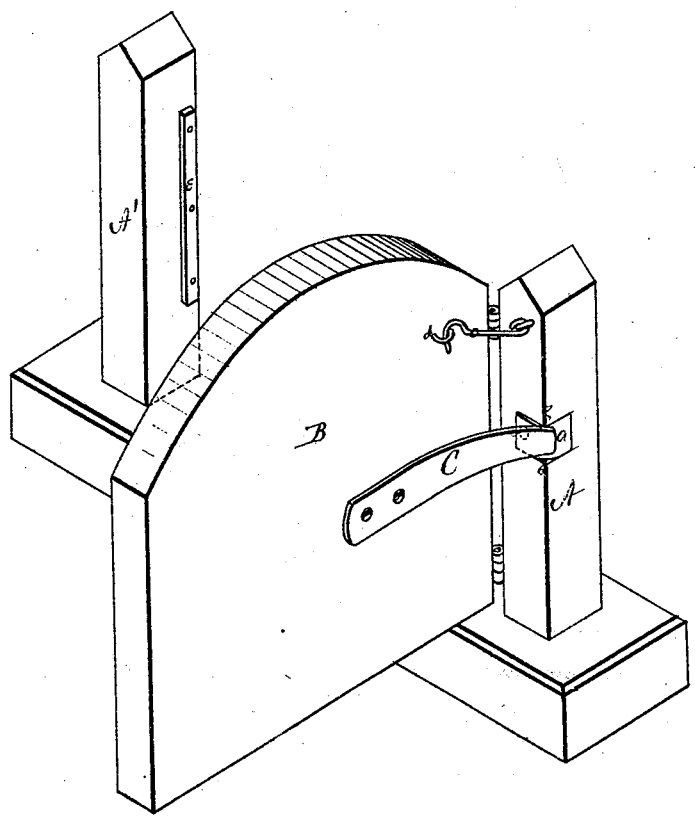
Witnesses
John A. Ellis
James V. White
Inventor
Jesse Harpster
Per,
J. H. Alexander,
Atty.

United States Patent Office.

JESSE HARPSTER, OF CLYDE, OHIO.

Letters Patent No. 96,002, dated October 19, 1869.

IMPROVEMENT IN GATES.

The Schedule referred to in these Letters Patent and making part of the same.

*To all whom it may concern:*

Be it known that I, JESSE HARPSTER, of Clyde, in the county of Sandusky, and State of Ohio, have invented certain new and useful Improvements in Gates; and I do hereby declare that the following is a full, clear, and exact description thereof, reference being had to the accompanying drawings, and to the letters of reference marked thereon, which form a part of this specification.

The nature of my invention consists in the construction and general arrangement of a "self-shutting gate," as will be hereinafter fully set forth.

In order to enable others skilled in the art to which my invention appertains to make and use the same, I will now proceed to describe its construction and operation, referring to the annexed drawings, which represent a perspective view of the gate held open.

A represents the gate-post, to which the gate B is hung, by suitable hinges.

The outer corner or edge of the post A is, for a short distance, at any desired point, rounded, and a curved plate, $a$, secured to the same, covering this rounded portion, so as to form a shoulder, $b$, at the edge of the post, above and below said plate.

To the gate B is secured a flat metal spring, C, the outer end of which bears on the metal plate $a$, and is of such size as to pass between the shoulders $b\ b$, said shoulders thus forming guides for the spring.

It will readily be seen, that when the gate is opened, the outer end of the spring C slides between the shoulders $b\ b$, on the curved plate $a$, and when the gate is let go, the spring, operating on the curved plate, will force the gate to, and close it.

When the gate is open, it may be held in that position by means of a hook, $c$, and eye $d$, as shown in the drawing.

On the opposite gate-post A' is nailed or otherwise secured, a strip, $e$, lined on the edge, where the gate strikes it, with rubber, to lessen or deaden the blow when the gate is shut. This device may be applied to any door, as well as to gates.

Having thus fully described my invention,

What I claim as new, and desire to secure by Letters Patent, is—

The combination and arrangement of the gate-posts A A', gate B, spring C, curved plate $a$, shoulders $b\ b$, hook $c$, eye $d$, and rubber-lined strip $e$, all constructed and operating substantially as shown and described.

In testimony that I claim the foregoing as my own, I affix my signature, in presence of two witnesses.

JESSE HARPSTER.

Witnesses:
 JOS. ZEPERNICK,
 WILLIAM ROWE.